(12) United States Patent
Sucan et al.

(10) Patent No.: US 9,440,647 B1
(45) Date of Patent: Sep. 13, 2016

(54) SAFELY NAVIGATING CROSSWALKS

(71) Applicant: Google Inc., Mountain View, CA (US)

(72) Inventors: Ioan-Alexandru Sucan, Mountain View, CA (US); Nathaniel Fairfield, Mountain View, CA (US)

(73) Assignee: Google Inc., Mountain View, CA (US)

( * ) Notice: Subject to any disclaimer, the term of this patent is extended or adjusted under 35 U.S.C. 154(b) by 3 days.

(21) Appl. No.: 14/492,459

(22) Filed: Sep. 22, 2014

(51) Int. Cl.
*G06F 7/70* (2006.01)
*G06F 19/00* (2011.01)
*G06G 7/00* (2006.01)
*G06G 7/76* (2006.01)
*B60W 30/08* (2012.01)

(52) U.S. Cl.
CPC .................................... *B60W 30/08* (2013.01)

(58) Field of Classification Search
CPC ..... B60W 30/08; B60W 50/14; G06F 19/00; G05D 1/024; G05D 1/0246; G05D 1/0274; G05D 1/00
USPC .......................... 701/1, 23, 70, 117, 118, 119
See application file for complete search history.

(56) References Cited

U.S. PATENT DOCUMENTS

| | | | | |
|---|---|---|---|---|
| 6,205,242 B1 * | 3/2001 | Onoguchi | ............ | G06K 9/3241 345/419 |
| 7,994,902 B2 * | 8/2011 | Avery | .................... | G08G 1/161 340/435 |
| 8,280,623 B2 | 10/2012 | Trepagnier et al. | | |
| 8,571,743 B1 * | 10/2013 | Cullinane | ................ | G05D 1/00 701/23 |
| 9,120,484 B1 * | 9/2015 | Ferguson | ............. | G05D 1/0214 |
| 2008/0162027 A1 * | 7/2008 | Murphy | ................ | B60W 50/14 701/117 |
| 2012/0166071 A1 * | 6/2012 | Shirahatti | .......... | G01C 21/3492 701/118 |
| 2014/0136414 A1 * | 5/2014 | Abhyanker | ............ | G06Q 50/28 705/44 |
| 2014/0195138 A1 * | 7/2014 | Stelzig | ................. | G08G 1/0116 701/119 |

OTHER PUBLICATIONS

Senlet et al., "Segmentation of Occluded Sidewalks in Satellite Images", 2012.

* cited by examiner

*Primary Examiner* — Jaime Figueroa
(74) *Attorney, Agent, or Firm* — Lerner, David, Littenberg, Krumholz & Mentlik, LLP

(57) ABSTRACT

Aspects of the disclosure relate to safely navigating crosswalks by responding to potentially occluded objects in such crosswalks. For example, a vehicle approaches a crosswalk and the vehicle's one more computing devices may generate a set of samples corresponding to locations in the crosswalk. Sensor data is periodically received by the one or more computing devices. For each given sample of the set of samples a probability value indicative of a probability of sample being occluded is set to an initial value by the one or more computing devices. As the vehicle approaches the crosswalk, probability values for the given sample are periodically adjusted by the one or more computing devices based on the periodically received sensor data. The speed of the vehicle then changed by the one or more computing devices based upon a determination that a sample of the set of samples has met the threshold value.

20 Claims, 9 Drawing Sheets

SAFELY NAVIGATING CROSSWALKS

BACKGROUND

Autonomous vehicles, such as vehicles which do not require a human driver, may be used to aid in the transport of passengers or items from one location to another. An important component of an autonomous vehicle is the perception system, which allows the vehicle to perceive and interpret its surroundings using various sensors such as cameras, radar, lasers, and other similar devices. For example, autonomous vehicles may use the sensors to gather and interpret images and sensor data about its surrounding environment, e.g., parked cars, trees, buildings, etc. Information from the perception system may be used by these vehicles to make numerous decisions while the autonomous vehicle is in motion, such as speeding up, slowing down, stopping, turning, etc.

Information from the perception system may also be combined with highly detailed map information in order to allow a vehicle's computer to safely maneuver the vehicle in various environments. This highly detailed map information may describe expected conditions of the vehicle's environment such as the shape and location of roads, traffic signals, and other objects. In this regard, the information from the perception system and detailed map information may be used to assist a vehicle's computer in making driving decisions involving how to maneuver the vehicle to avoid other objects in the roadway while obeying traffic laws. This may be especially difficult where some objects in the roadway are occluded by other objects.

BRIEF SUMMARY

One aspect of the disclosure provides a method. The method includes identifying, by one or more computing devices, that a first vehicle is approaching a crosswalk; generating, by the one or more computing devices, a set of samples corresponding to locations in the crosswalk; and periodically receiving, by the one or more computing devices, sensor data. For each given sample of the set of samples, the method also includes setting, by the one or more computing devices, a probability value to an initial value and as the first vehicle approaches the crosswalk periodically adjusting, by the one or more computing devices, probability value for the given sample based on the periodically received sensor data. The probability value indicates a probability that the given sample is occluded. The method also includes determining, by the one or more computing devices, that an updated probability value for a particular sample of the set of samples has met a threshold value and changing, by the one or more computing devices, the speed of the first vehicle based on the determination that a sample of the set of samples has met the threshold value.

In one example, adjusting the probability value for a first given sample of the set of samples is further based on whether the sensor data indicates that a second vehicle is crossing through the location of the first given sample. In this example, adjusting the probability value includes decreasing the probability value of the first given sample when the sensor data indicates that the second vehicle is crossing through the location of the first given sample. In another example, adjusting the probability value for a first given sample of the set of samples is further based on whether the sensor data indicates that another vehicle is crossing through the crosswalk and the location of the first given sample is on a far side of the another vehicle from the second vehicle. In this example, adjusting the probability value of the first given sample includes decreasing the probability value for the first given sample when the sensor data indicates that the second vehicle is crossing through the location of the given sample. In another example, adjusting the probability value for a first given sample of the set of samples is further based on whether the sensor data indicates the first given sample is visible to a sensor of the vehicle. In this example, adjusting the probability value for the first given sample includes decreasing the probability value for the first given sample when the sensor data indicates that the given sample is visible to a sensor of the vehicle. Alternatively, adjusting the probability value for the first given sample includes increasing the probability value for the first given sample when the sensor data indicates that the first given sample is not visible to a sensor of the vehicle.

Another aspect of the disclosure provides a system including one or more computing devices. The one or more computing devices are configured to identify that a first vehicle is approaching a crosswalk, generate a set of samples corresponding to locations in the crosswalk, and periodically receive sensor data. For each given sample of the set of samples, the one or more computing devices are also configured to set a probability value to an initial value and as the first vehicle approaches the crosswalk, periodically adjust probability value for the given sample based on the periodically received sensor data. The probability value indicates a probability that the given sample is occluded. The one or more computing devices are also configured to determine that an updated probability value for a particular sample of the set of samples has met a threshold value and change the speed of the first vehicle based on the determination that a sample of the set of samples has met the threshold value.

In one example, the one or more computing devices are further configured to adjust the probability value for a first given sample of the set of samples further based on whether the sensor data indicates that a second vehicle is crossing through the location of the first given sample. In this example, the one or more computing devices are further configured to adjust the probability value for the first given sample by decreasing the probability value for the first given sample when the sensor data indicates that the second vehicle is crossing through the location of the first given sample. In another example, the one or more computing devices are further configured to adjust the probability value for a first given sample of the set of samples further based on whether the sensor data indicates that another vehicle is crossing through the crosswalk and the location of the first given sample is on a far side of the another vehicle from the second vehicle. In this example, the one or more computing devices are further configured to adjust the probability value for the first given sample by decreasing the probability value for the first given sample when the sensor data indicates that the second vehicle is crossing through the location of the first given sample. In another example, the one or more computing devices are further configured to adjust the probability value for a first given sample of the set of samples further based on whether the sensor data indicates the first given sample is visible to a sensor of the vehicle. In this example, the one or more computing devices are further configured to adjust the probability value for the first given sample by decreasing the probability value for the first given sample when the sensor data indicates that the first given sample is visible to a sensor of the vehicle. Alternatively, the one or more computing devices are further configured to adjust the probability value for the first given sample by increasing the probability value for the first given sample when the sensor data indicates that the first given sample is not visible to a sensor of the vehicle. In another example, the system also includes the first vehicle.

A further aspect of the disclosure provides a non-transitory, tangible machine readable medium on which instructions are stored. The instructions, when executed by one or more processors, cause the one or more processors to perform a method. The method includes identifying that a first vehicle is approaching a crosswalk, generating a set of samples corresponding to locations in the crosswalk, and periodically receiving sensor data. For each given sample of the set of samples, the method also includes setting a probability value to an initial value and as the first vehicle approaches the crosswalk, periodically adjusting probability value for the given sample based on the periodically received sensor data. The probability value indicates a probability that the given sample is occluded. The method also includes determining that an updated probability value for a particular sample of the set of samples has met a threshold value and changing the speed of the first vehicle based on the determination that a sample of the set of samples has met the threshold value.

In one example, adjusting the probability value for a first given sample of the set of samples is further based on whether the sensor data indicates that a second vehicle is crossing through the location of the first given sample. In this example, adjusting the probability value for the first given sample is further based on whether the sensor data indicates that another vehicle is crossing through the crosswalk and the location of the first given sample is on a far side of the another vehicle from the second vehicle.

DETAILED DESCRIPTION

Overview

Figure 1:
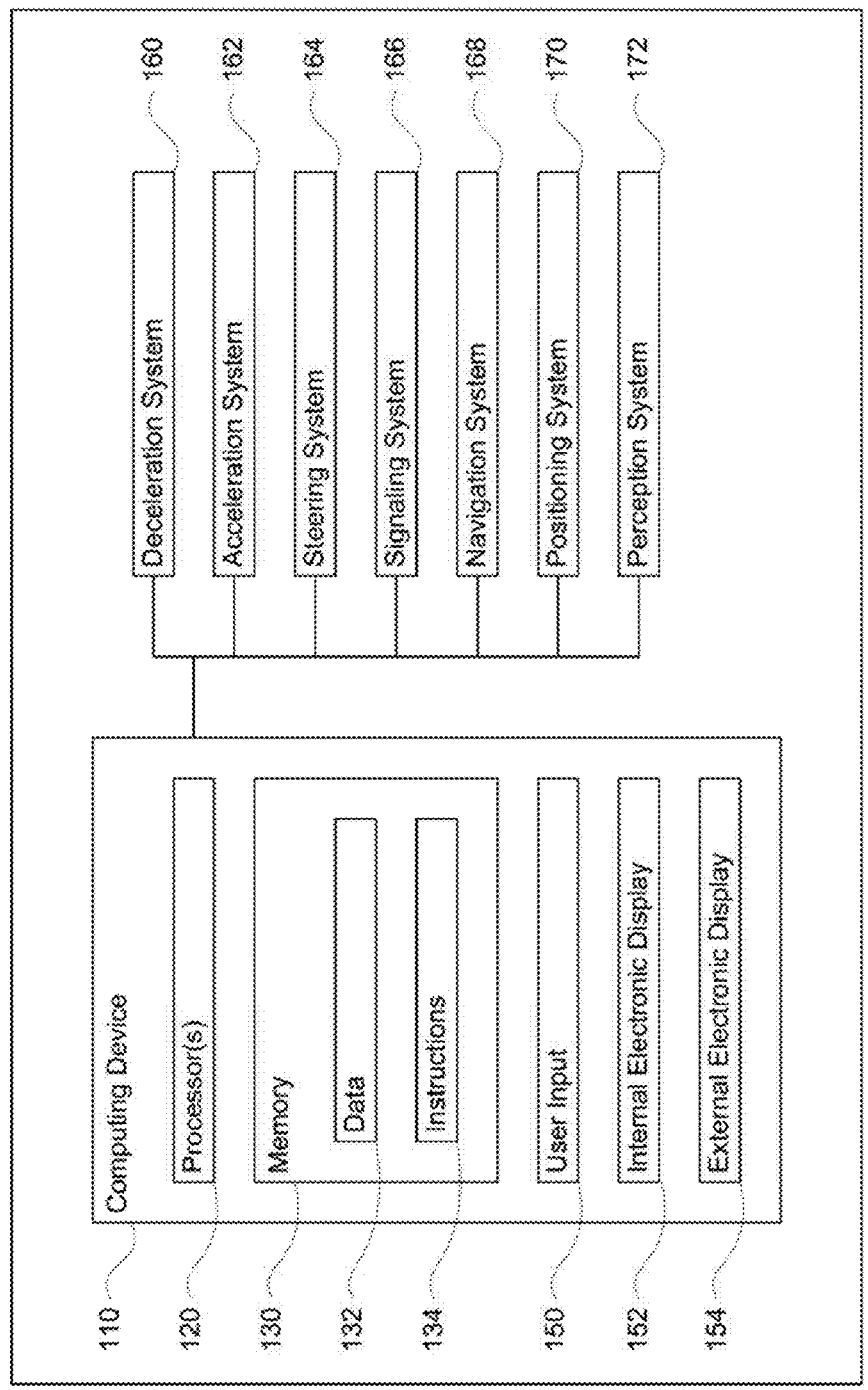
FIG. 1 is a functional diagram of a system in accordance with aspects of the disclosure.

The technology relates to safely navigating crosswalks that may be partially occluded. For example, autonomous vehicles may travel on roadways which include crosswalks. In many examples, various objects such as moving or parked vehicles or trees may cause parts of the crosswalk to be occluded, or not directly visible to sensors of the autonomous vehicle's perception system. Because of this, the autonomous vehicle's one or more computing devices may estimate the probability that some point in a crosswalk is occluded and adapt the vehicle's speed in order to proceed safely.

For example, when an autonomous vehicle is approaching a crosswalk, the autonomous vehicle's one or more computing devices may first identify a representative set of points or samples on the crosswalk. For each sample of the set, the autonomous vehicle's one or more computing devices may estimate a probability of an occluded object, such as a pedestrian, in the crosswalk. In order to do so, each sample may be provided with an initial probability value.

As the autonomous vehicle approaches the crosswalk, these probability values may be adjusted periodically. As an example, a decision tree may be used to determine how to adjust the probability values. The decision tree may include various conditions. In one condition, if a sample is visible to the vehicle's sensors, the probability of an object, such as pedestrian, being there and not being visible to the sensors would be low. As such, the probability value for that sample may be adjusted, for example, decreased or increased depending upon the scale of probability values used.

In another condition, a sample may be considered to be protected. In one example, if the sample is not visible to the vehicle's sensors, but there is another object (such as a vehicle) passing through the sample, the sample may be considered to be protected. In another example, if another object or vehicle adjacent to the autonomous vehicle passes through the crosswalk, samples on the far side the other vehicle, may also be considered to be protected. In these examples of protected samples, the probability of an object, such as pedestrian, being at that sample and not being visible to the sensors would also be low. As such, the probability for such a protected sample may be adjusted, for example, decreased or increased depending upon the scale of probability values used. In this regard, in yet another condition, if a sample is not visible to the sensors of the autonomous vehicle's perception system and not protected, the probability value for that sample may be adjusted, for example, increased or decreased depending upon the scale of probability values used.

The autonomous vehicle's one or more computing devices may also determine whether and when the probability value meets a threshold value. For example, the autonomous vehicle's one or more computing devices may determine whether the probability of any sample being occluded has become too high, or greater than the threshold value. If so, then the vehicle's computers may slow the vehicle down as the vehicle approaches the crosswalk. If not, the vehicle may continue towards the crosswalk on its current trajectory, assuming that there are no other environmental conditions which would require the vehicle to change its trajectory.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys. The vehicle may have one or more computing devices, such as computing device 110 containing one or more processors 120, memory 130 and other components typically present in general purpose computing devices.

The memory 130 stores information accessible by the one or more processors 120, including data 132 and instructions 134 that may be executed or otherwise used by the processor(s) 120. The memory 130 may be of any type capable of storing information accessible by the processor(s), including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The data 132 may be retrieved, stored or modified by processor(s) 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The one or more processors 120 may be any conventional processors, such as commercially available CPUs. Alternatively, the one or more processors may be a dedicated device such as an ASIC or other hardware-based processor, such as a field programmable gate array (FPGA). Although FIG. 1 functionally illustrates the processor(s), memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may have all of the components normally used in connection with a computing device such as the processor and memory described above, as well as a user input 150 (e.g., a mouse, keyboard, touch screen and/or microphone) and various electronic displays (e.g., a monitor having a screen, a small LCD touch-screen or any other electrical device that is operable to display information). In this example, the vehicle includes an internal electronic display 152. In this regard, internal electronic display 152 may be located within a cabin of vehicle 100 and may be used by computing device 110 to provide information to passengers within the vehicle 100.

In one example, computing device 110 may be an autonomous driving computing system incorporated into vehicle 100. The autonomous driving computing system may capable of communicating with various components of the vehicle as needed in order to control the vehicle in fully autonomous (without input from a driver) as well as semi-autonomous (some input from a driver) driving modes.

Figure 2:
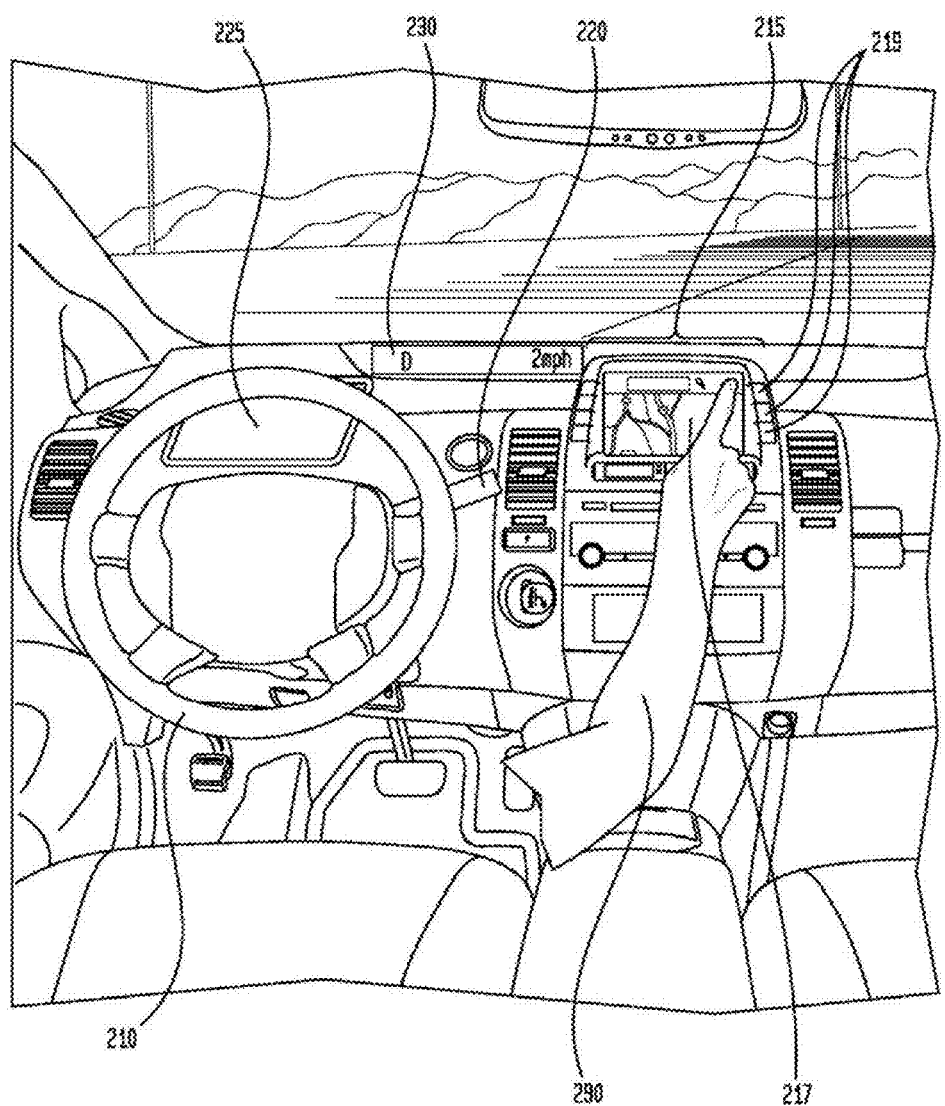
FIG. 2 is an interior of an autonomous vehicle in accordance with aspects of the disclosure.

As an example, FIG. 2 depicts an interior design of a vehicle having autonomous, semi-autonomous, and manual (continuous input from a driver) driving modes. In this regard, the autonomous vehicle may include all of the features of a non-autonomous vehicle, for example: a steering apparatus, such as steering wheel 210; a navigation display apparatus, such as navigation display 215 (which may be a part of electronic display 152); and a gear selector apparatus, such as gear shifter 220. The vehicle may also have various user input devices 140 in addition to the foregoing, such as touch screen 217 (again, which may be a part of electronic display 152), or button inputs 219, for activating or deactivating one or more autonomous driving modes and for enabling a driver or passenger 290 to provide information, such as a navigation destination, to the computing device 110.

Returning to FIG. 1, when engaged, the computing devices 110 may control some or all of these functions of vehicle 100 and thus be fully or partially autonomous. It will be understood that although various systems and computing device 110 are shown within vehicle 100, these elements may be external to vehicle 100 or physically separated by large distances.

In this regard, computing device 110 may be in communication various systems of vehicle 100, such as deceleration system 160, acceleration system 162, steering system 164, signaling system 166, navigation system 168, positioning system 170, and perception system 172, such that one or more systems working together may control the movement, speed, direction, etc. of vehicle 100 in accordance with the instructions 134 stored in memory 130. Although these systems are shown as external to computing device 110, in actuality, these systems may also be incorporated into computing device 110, again as an autonomous driving computing system for controlling vehicle 100.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 132 may store map information, e.g., highly detailed maps identifying the shape and elevation of roadways, lane lines, intersections, crosswalks, speed limits, traffic signals, buildings, signs, real time traffic information, vegetation, or other such objects and information.

Figure 3:
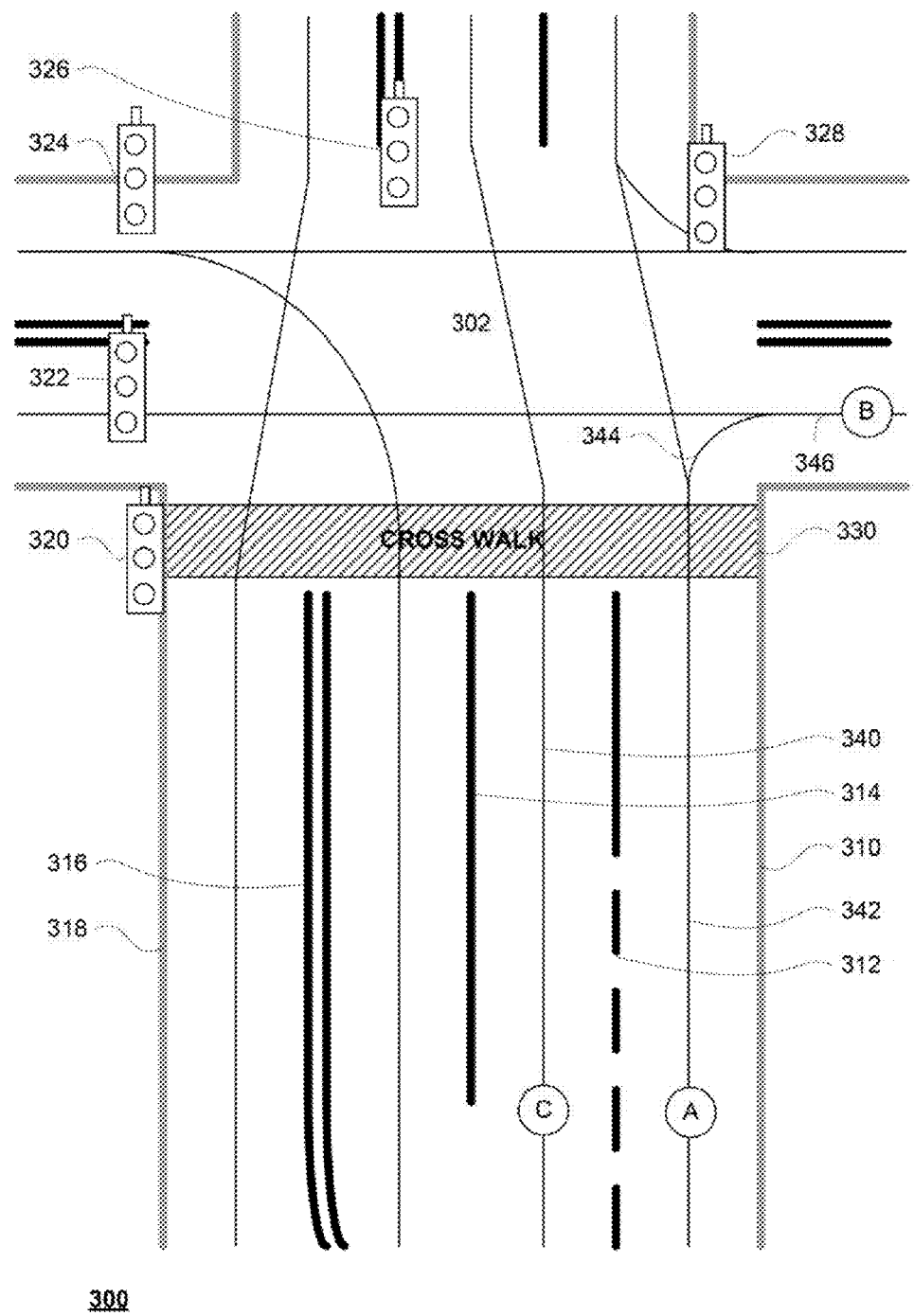
FIG. 3 is an example of detailed map information in accordance with aspects of the disclosure.

FIG. 3 is an example of detailed map information 300 for a section of roadway including an intersection 302. In this example, the detailed map information 300 includes information identifying the shape, location, and other characteristics of lane lines 310, 312, 314, 316, 318, traffic signals 320, 322, 324, 326, 328, and crosswalk 330.

In addition, the detailed map information includes a network of rails 340, 342, 344, 346 which provide the vehicle's computer with guidelines for maneuvering the vehicle so that the vehicle follows the rails and obeys traffic laws. As an example, a vehicle's computer may maneuver the vehicle from point A to point B (two fictitious locations not actually part of the detailed map information) by following rail 342, transitioning to rail 344, and subsequently transitioning to rail 342 in order to make a right turn at intersection 302.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 172 also includes one or more components for detecting and performing analysis on objects external to the vehicle such as other vehicles, obstacles in the roadway, traffic signals, signs, trees, etc. For example, the perception system 172 may include lasers, sonar, radar, cameras, or any other detection devices which record data which may be processed by computing device 110. In the case where the vehicle is a small passenger vehicle such as a car, the car may include a laser mounted on the roof or other convenient location as well as other sensors such as cameras, radars, sonars, and additional lasers. The computing device 110 may control the direction and speed of the vehicle by controlling various components. The vehicle's perception system 172 and/or computing device 110 (using information received from the perception system) may thus rely on any known techniques for detecting and identifying objects in the vehicle's environment.

By way of example, if the vehicle is operating completely autonomously, computing device 110 may navigate the vehicle to a location using data from the detailed map information and navigation system 168. Computing device 110 may use the positioning system 170 to determine the vehicle's location and use the perception system 172 to detect, identify, and respond to objects when needed to reach the location safely. In order to do so, computing device 110 may cause the vehicle to accelerate (e.g., by increasing fuel or other energy provided to the engine by acceleration system 162), decelerate (e.g., by decreasing the fuel supplied to the engine or by applying brakes by deceleration system 160), change direction (e.g., by turning the front or rear wheels of vehicle 100 by steering system 164), and signal such changes (e.g. by lighting turn signals of signaling system 166).

Figure 4:
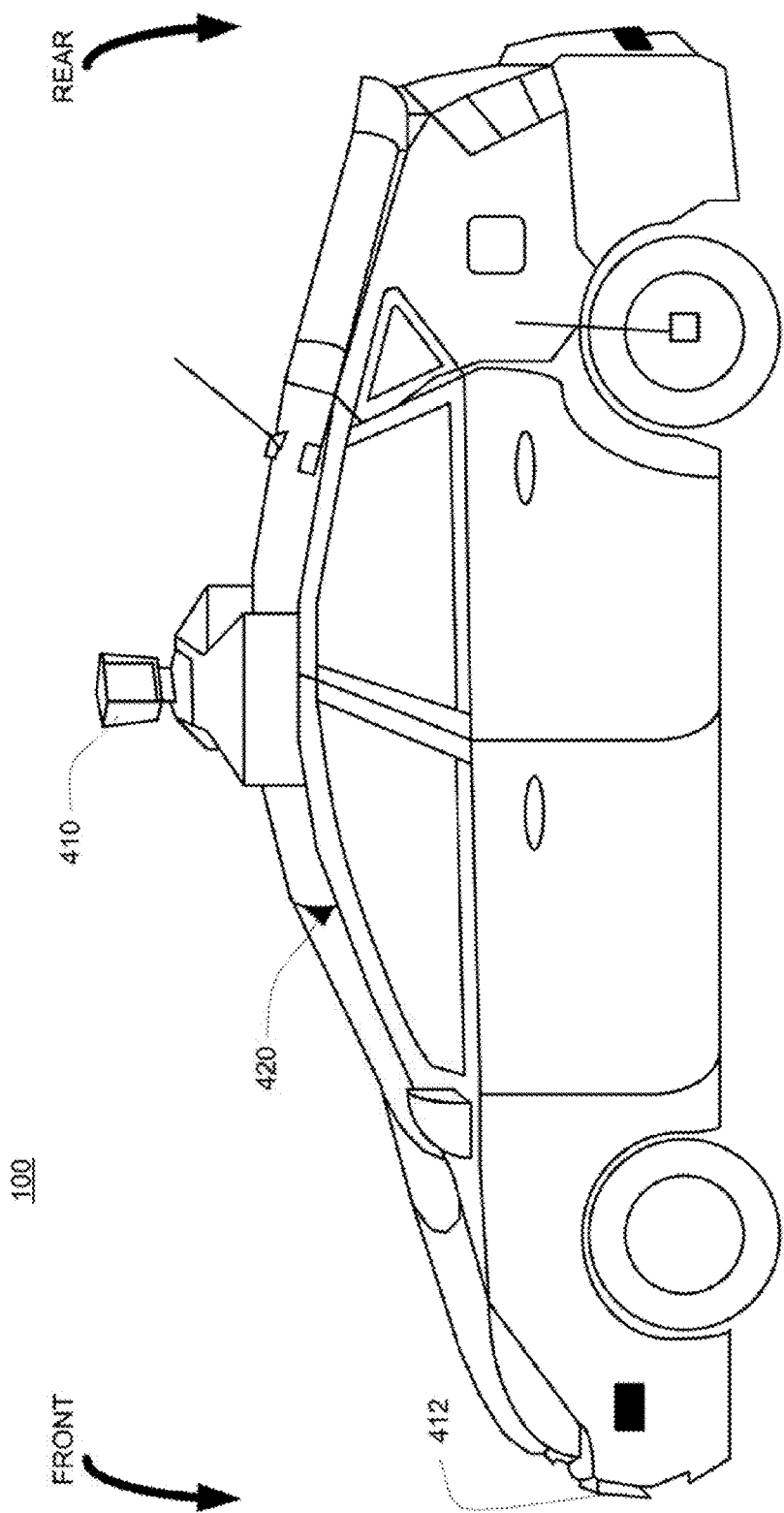
FIG. 4 is an exterior of an autonomous vehicle in accordance with aspects of the disclosure.

FIG. 4 is an example external view of vehicle 100 described above. As shown, various components of the perception system 172 may be positioned on or in the vehicle 100 in order to better detect external objects while the vehicle is being driven. In this regard, one or more sensors, such as laser range finders systems 410 and 412 including one or more lasers and associated computing devices may be positioned or mounted on the vehicle. In addition, the perception system may include one or more cameras 420 mounted internally on the windshield of vehicle 100 to receive and analyze various images about the environment. In addition to the laser range finder systems 410 and 412 and the one or more cameras 420 mounted internally on the windshield, other detection devices, such as sonar, radar, GPS, etc., may also be positioned in a similar manner.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 5:
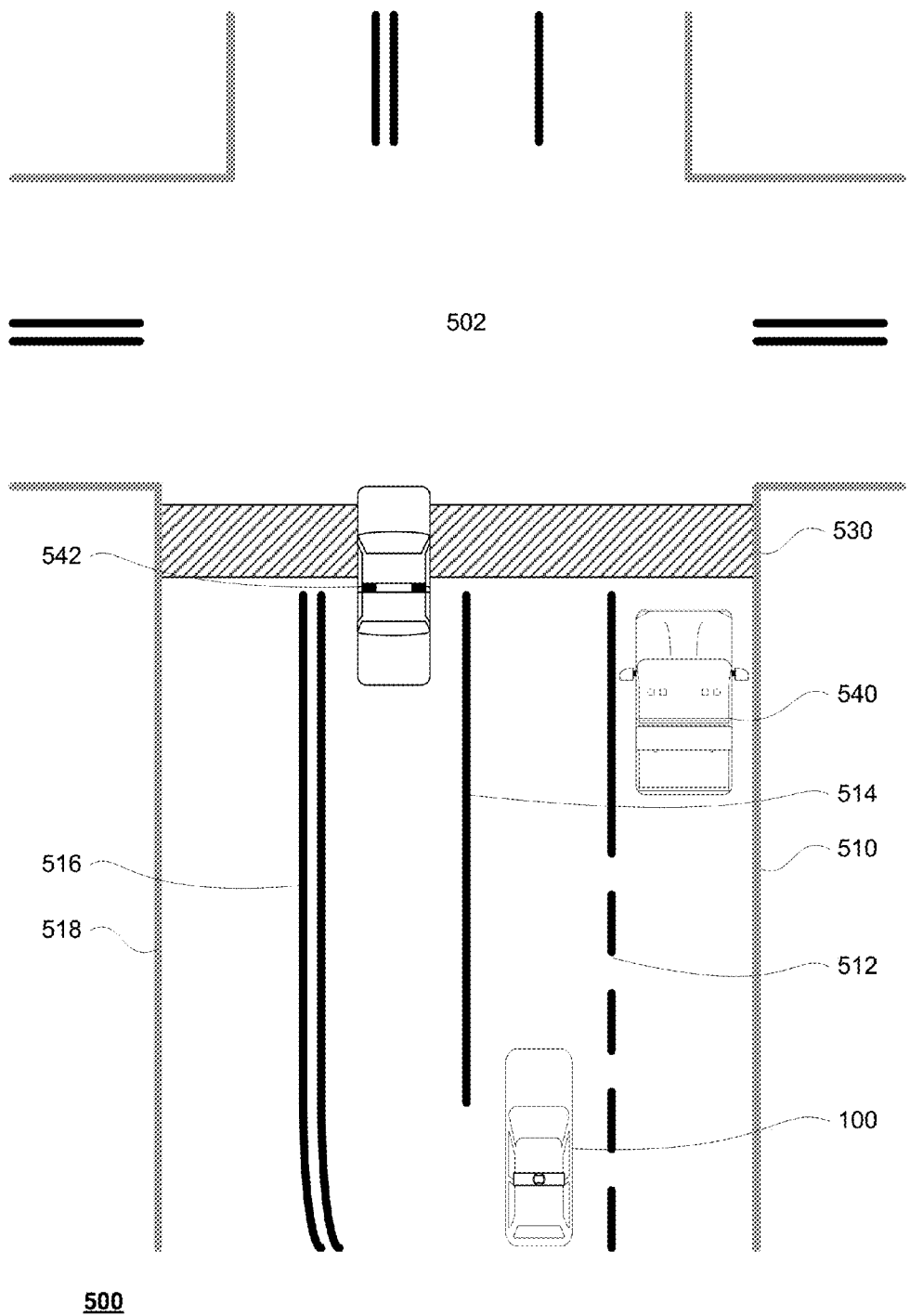
FIG. 5 is an example bird's eye view of a section of roadway including an intersection in accordance with aspects of the disclosure.

As noted above, a vehicle's one or more computing devices may maneuver the vehicle using the various systems described above. For example, FIG. 5 depicts a section of roadway 500 including an intersection 502. In this example, vehicle 100 is approaching intersection 502 and may be controlled, for example by one or more computing device 110 in an autonomous driving mode as described above.

Intersection 502 corresponds to the intersection 302 of the detailed map information 300. In this regard, lane lines 510, 512, 514, 516, and 518 correspond to the shape, location, and other characteristics of lane lines 310, 312, 314, 316, and 318 respectively. Similarly crosswalk 530 corresponds to the shape, location, and other characteristics of crosswalk 330, respectively. In this regard, vehicle's position relative to intersection 502 may correspond to that of point C relative to the detailed map information 300. In the example of FIG. 5, traffic signals corresponding to traffic signals 320, 322, 324, 326, and 328 are not shown for the purposes of clarity.

Again, as vehicle 100 approaches intersection 502, the vehicle's perception system may detect and identify the various features of the intersection 502 as well as other objects in the vehicle's environment. For example, the perception system may detect and identify objects 542 and 540 as vehicles that are also approaching the intersection. In the example of FIG. 5, vehicle 540 has not yet reached the crosswalk 530 while vehicle 542 is passing though (or crossing over) the crosswalk. Although only two other vehicles are shown for simplicity, any number of additional vehicles may be passing through the intersection 502 from various directions depending, for example, on the traffic rules or status of the various traffic signals of intersection 502.

In addition to the vehicles 540 and 542, the vehicle's perception system 172 may also detect and identify the shape and location of objects such as crosswalk 530. Because corresponding crosswalk 330 is included in the detailed map information 300, the vehicle's computers 110 may determine when the vehicle's perception system 172 should detect the crosswalk.

Figure 6:
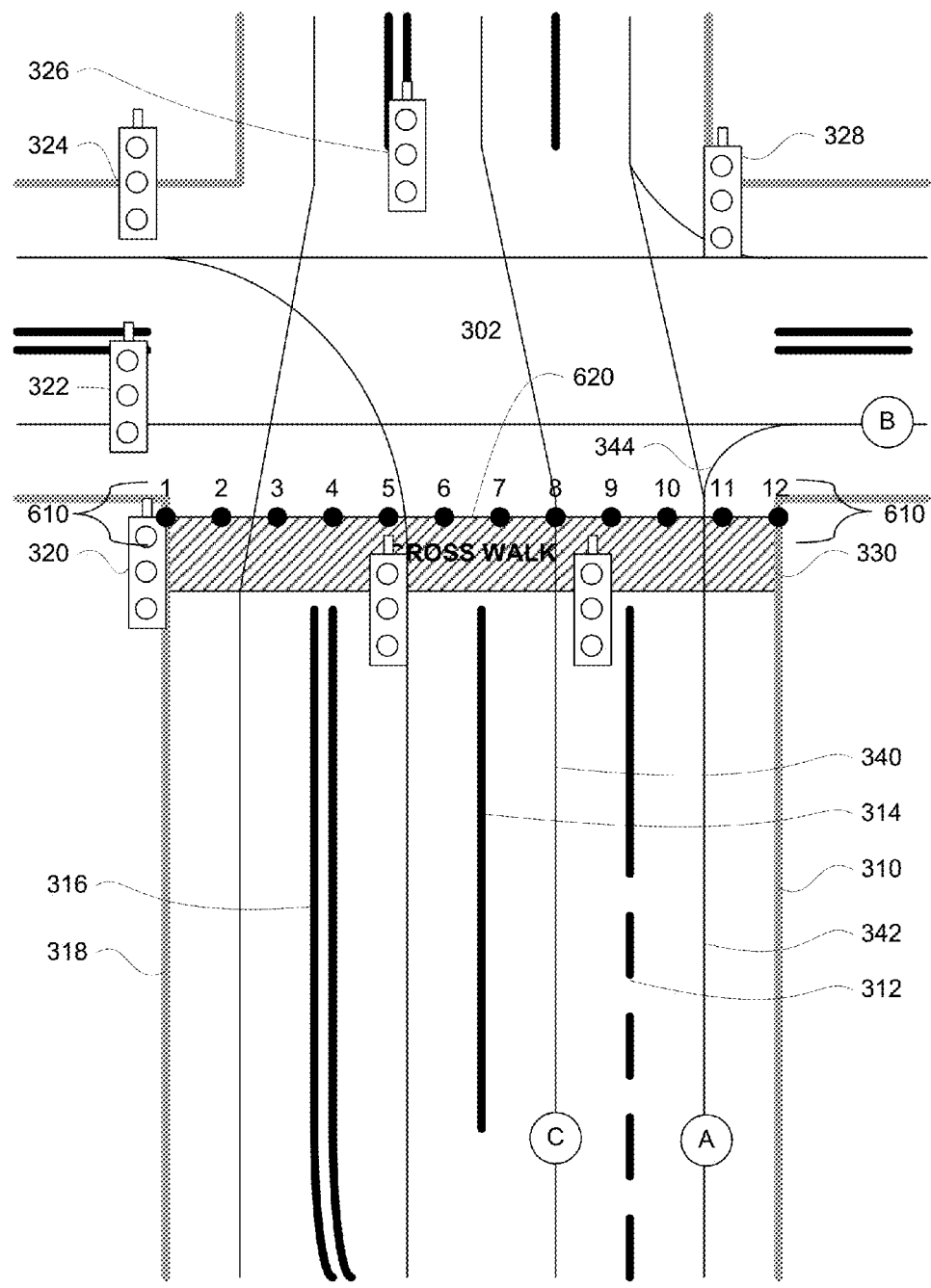
FIG. 6 is an example of detailed map information and data in accordance with aspects of the disclosure.
Figure 7:
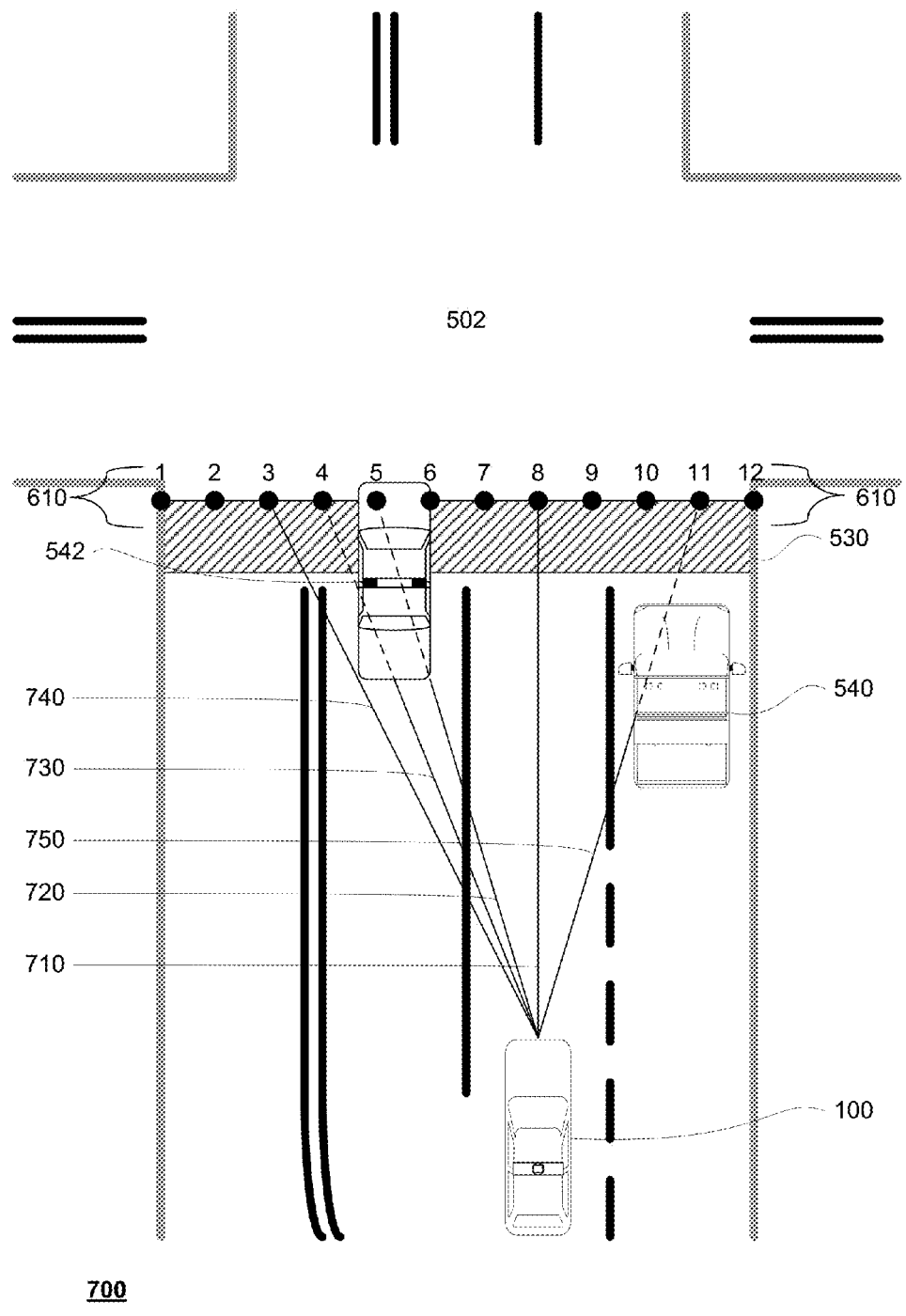
FIG. 7 is an example bird's eye view of a section of roadway including an intersection and data in accordance with aspects of the disclosure.

When the vehicle's perception system 172 is able to detect the crosswalk or when the vehicle's computers expect that the perception system should detect the crosswalk, the vehicle's computing device 110 may generate a set of points or samples for the crosswalk 330. For example, as shown in example 600 of FIG. 6, crosswalk 330 includes a set of samples 610, including individual samples 1-12, arranged along the length of the crosswalk 330. Each of the samples may be associated with location information, for example latitude and longitude or other coordinates, corresponding to a real-world location as shown in FIG. 7.

In this example, the samples may be spaced a fixed, pre-determined distance from one another, such as 1.5 meters or more or less, along an edge 620 of the crosswalk 330. In that regard, the number of samples in the set may depend upon the length of the crosswalk or the width of the roadway. Larger distances between the samples may increase the likelihood that an occluded object in the crosswalk would not be detected by the autonomous vehicle's perception system 172, while smaller distances would require more samples which may increase the computational requirements of the vehicle's computers.

In addition, while edge 620 is an edge of the crosswalk farthest from vehicle 100 or a far edge, the set of samples may be arranged along the edge nearest to vehicle 100 (near edge), a center line of the crosswalk, or at some other location proximate to the crosswalk.

Each sample of the set of samples may be provided with an initial probability value. A probability value may indicate a probability that an occluded object, such as a pedestrian, is in the crosswalk at the location of the sample associated with that probability value. Thus, the initial probability values for each sample of the set of samples may be equal to one another. In one example, if the scale of the probability values is from 0 to 1, where 1 is a very high probability of an occluded object and 0 is a very low probability of an occluded object, the initial probability value for each sample may be set to 0.5. Of course, other initial values may also be used.

The samples may be generated when the vehicle is a certain distance from the expected location of crosswalk 530 corresponding to the location of crosswalk 330 of the detailed map information 300. This distance may be based on when the crosswalk 530 should be within the range of the sensors of the perception system based on the expected location of crosswalk 330 from the detailed map information 300, when the perception system 172 first detects or should detect the crosswalk 530, or when the perception system detects objects at, near, or around the crosswalk 530. In this regard, distance may be related to the range of the sensors of the vehicle's perception system. For example, a laser system may be able to detect a crosswalk anywhere from 50 to 200 meters away depending upon the range of the lasers of the laser system.

Figure 8:
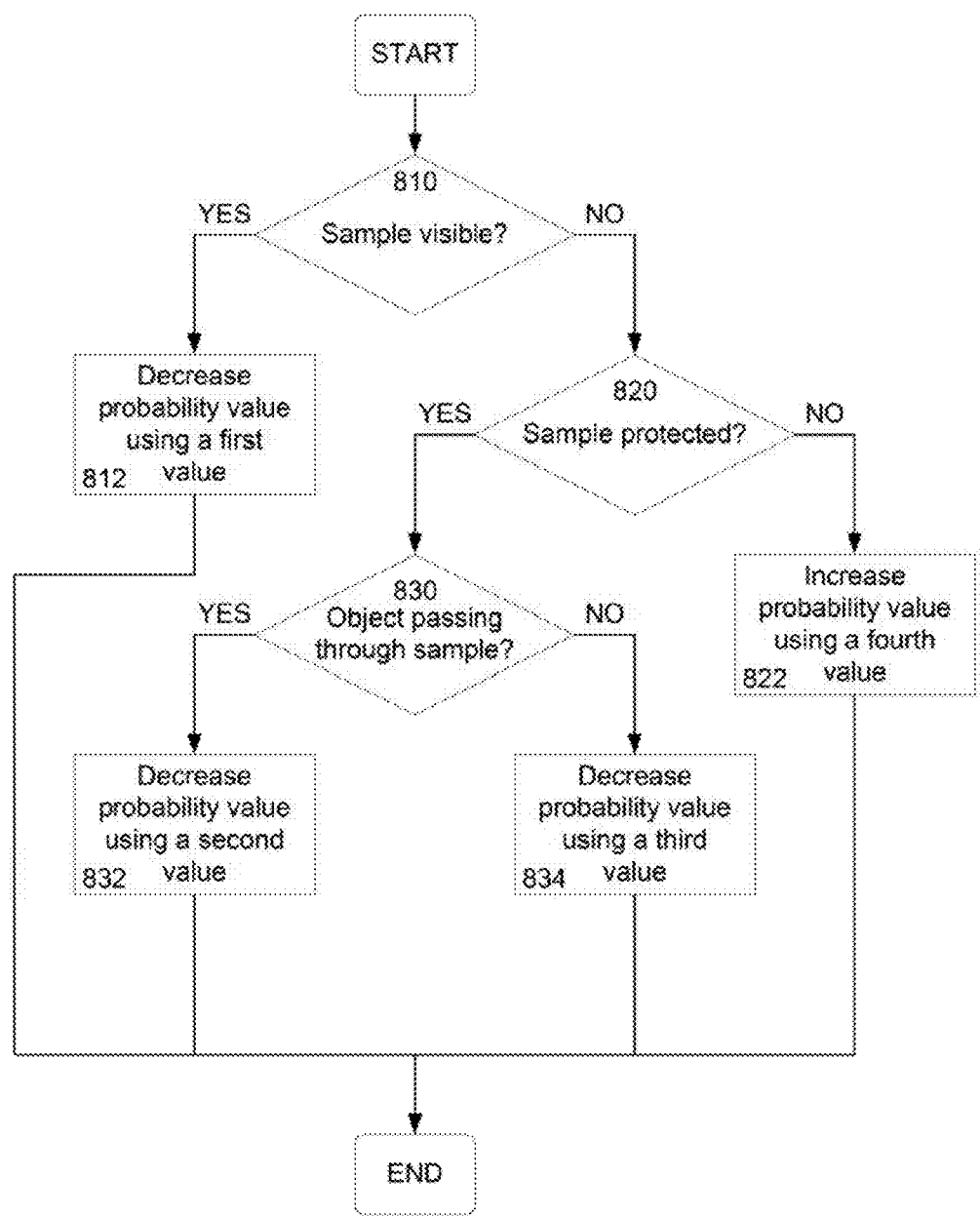
FIG. 8 is an example decision tree in accordance with aspects of the disclosure.

In one example, a decision tree may be used to determine how to adjust the probability values for each sample. FIG. 8 is an example decision tree 800 including a plurality of different decisions and outcomes that may be used to adjust the probability value of a sample of the set of samples. Of course, the decisions and outcomes of the decision tree may also be differently arranged. A first condition may relate to the visibility of a sample. For example, referring to FIG. 8, decision block 810 relates to whether a sample is currently visible to the sensors of the perception system. If this case, the probability of an object, such as pedestrian, being there and not being visible to the sensors would be low and the probability value for that sample may be decreased.

For instance, referring to FIG. 7, sample 8 may be visible to the sensors of the vehicle because a sensor such as laser range finder systems 410 or 412 may have a direct line of sight along line 710 to the location of that sample. As such, the probability value for sample 8 may be decreased using a first value as shown in outcome block 812. Using the example above where the probability values are on a scale of 0 to 1, the probability value for sample 8 may be decreased by multiplying the probability value by a first value that is less than 1, such as 0.5 or more or less. Using the initial probability for sample 8, the adjusted probability value may be determined by (0.5)*(0.5) as 0.25.

Another condition may relate to whether the sample is considered to be "protected" for some reason. For example, referring to FIG. 8, decision block 820 relates to whether a sample is currently not visible to the sensors of the perception system 172 and also protected. In one example, if the sample is not visible to the vehicle's sensors, but there is another vehicle passing through the sample, the sample may be considered to be protected.

Referring again to FIG. 7, sample 5 is not visible to the sensors of the vehicle because vehicle 542 is occluding the line of sight of the sensors of the perception system 172 along line 720 to the location of that sample (occluded portions of line 720 being shown in dashed line). However, at this point, vehicle 542 is actually passing through the location of sample 5. Thus, sample 5 may be considered to be protected. In other words, the vehicle's computing device 110 may assume that because another vehicle is passing through the sample, that other vehicle would not have driven through a pedestrian or other such object and the probability value for that sample may be decreased.

In another example of a protected sample, if another vehicle adjacent to the autonomous vehicle passes through the crosswalk, samples on the far side the other vehicle may also be considered to be protected. In this regard, these samples would also be hidden to the sensors because they are occluded by the other vehicle.

For instance, referring to FIG. 7, sample 4 is not visible to the sensors of the vehicle because vehicle 542 is occluding the line of sight of the sensors of the perception system 172 along line 730 to the location of that sample (occluded portions of line 730 being shown in dashed line). At this point, vehicle 542 is actually passing through the location of sample 5 but not sample 4. Thus, as noted above, sample 5 may be considered to be protected and any samples on the far side of sample 5 from the vehicle 100 and that are also not visible to the sensors of the perception system or sample 4 may also be considered to be protected. Thus, sample 3, which would be visible to the sensors of the perception system 172 along line 740 may not also be considered protected. In other words, the vehicle's computing device 110 may assume that because another vehicle is passing very close to that sample which is not visible to the sensors of perception system, that other vehicle would not have driven through a pedestrian or other such object and the probability value for that sample may be decreased.

Thus, for such protected samples, the probability of an object, such as pedestrian, being at the location of such samples and not being visible to the sensors would also be low. As such, the probability for samples 4 and 5 may be decreased. In one example, the probability value may be decreased by multiplying the probability value by a value that is less than 1 and also less than the first value (though this is not necessary), such as 0.4 or more or less. Using the initial probability for samples 4 and 5, the adjusted probability values may be determined by (0.5)*(0.4) as 0.20. In that regard, the value used to decrease the probability of a sample due to being occluded and protected may be smaller than the value used to decrease the probability of a sample due to being visible.

In some instances, why a sample is considered to be protected may dictate how the probability value for that sample is adjusted. For example, the second value may be greater when a sample is protected because it is being passed over by another vehicle than when a sample is protected because it is on the far side another vehicle that is passing over the crosswalk. However, the reverse may also be true.

Referring again to FIG. 8, the decision tree includes decision block 830 that relates to why a sample which is not visible to the sensors of the perception system is protected. In particular, block 830 relates to whether another object, such as a vehicle, is passing through the sample. If so, the probability value for that sample may be decreased using a second value as shown in outcome block 832. Using the example above where the probability values are on a scale of 0 to 1, the probability value for sample 8 may be decreased by multiplying the probability value by a first value that is less than 1 and also less than the first value (though again, this is not necessary), such as 0.4 or more or less. Using the initial probability for sample 8, the adjusted probability value may be determined by (0.5)*(0.4) as 0.20.

If another object is not passing through the sample, but the sample is protected because it is located on the far side of an object or vehicle that is also passing through the crosswalk, the probability value for that sample may be decreased using a third value as shown in outcome block 834. As such, the probability value for sample 4 may also be decreased. Using the example above where the probability values are on a scale of 0 to 1, the probability value for sample 4 may be decreased by multiplying the probability value by a third value that is less than 1 also less than the second value, such as 0.3 or more or less. Using the initial probability for sample 4, the adjusted probability value may be determined by (0.5)*(0.3) as 0.15.

If a sample is neither visible to the vehicle's sensors nor protected as described above, the probability of an occluded object, such as a pedestrian, is in the crosswalk at the location of that sample may be relatively high. Thus, the probability value of such samples may be increased using a fourth value as shown in outcome block 822. For example, sample 11 of FIG. 7 is not visible to the sensors of the vehicle because vehicle 540 is occluding the line of sight of the sensors of the perception system 172 along line 750 to the location of that sample (occluded portions of line 750 being shown in dashed line). In addition, sample 11 is not protected as it is not being passed through by an object, such as a vehicle, nor is sample 11 on the far side of an object, such as a vehicle, passing through the cross walk. Thus, sample 11 is neither visible nor protected. Using the example above where the probability values are on a scale of 0 to 1, the probability value for sample 11 may be increased by multiplying the probability value by a fourth value that is greater than 1, such as 1.5 or more or less. Using the initial probability for sample 11, the adjusted probability value may be determined by (0.5)*(1.5) as 0.75.

The sensor data corresponding to the location sample of the set of samples may be analyzed to determine how to adjust the probability values for each sample. Thus, the probability values of each of the samples 1-12 of set of samples 610 may be adjusted using the decision tree 800 as described above.

As the vehicle approaches the crosswalk, these probability values for each sample of the set of samples may be adjusted periodically. For example, the adjustment to each sample of the set of samples may be performed 10 to 20 times per second depending on how much data is received from the sensors of the perception system 172. In this regard, if more updates are received from the sensors, more adjustments to the probability values may be made. However, there is a tradeoff between the length of the period for adjustment and the computational requirements of the vehicle's computer 119.

The vehicle's computing device may also determine whether and when any probability value of a sample of the set of samples meets a threshold value. For example, the vehicle's computing device 110 may determine whether the probability of any sample being occluded is too high, or greater than the threshold value. In this regard, the probability of an occluded object, such as a pedestrian, being at the location of a sample would be such that the vehicle should act as if there was actually a pedestrian there. For instance, the threshold value may be some value greater than the initial probability value, such as 0.8 or more or less. If so, then the vehicle's computers may slow the vehicle down to some predetermined speed, such as 10 or 15 miles per hour or more or less, as the vehicle approaches the crosswalk. In some examples, when the threshold is met, a notification may be provided to the driver of vehicle 100, for example via internal electronic display 152, indicating that a portion of a crosswalk is occluded, for example, and to indicate that the vehicle is proceeding with caution.

If none of the samples meet the threshold value, the vehicle may continue towards the crosswalk on its current trajectory adjusting the probability values as described above assuming that there are no other environmental conditions which would require the vehicle to change its trajectory such as a change to a color of a traffic signal light, the behavior of another vehicle or object proximate to the vehicle 100, etc.

Figure 9:
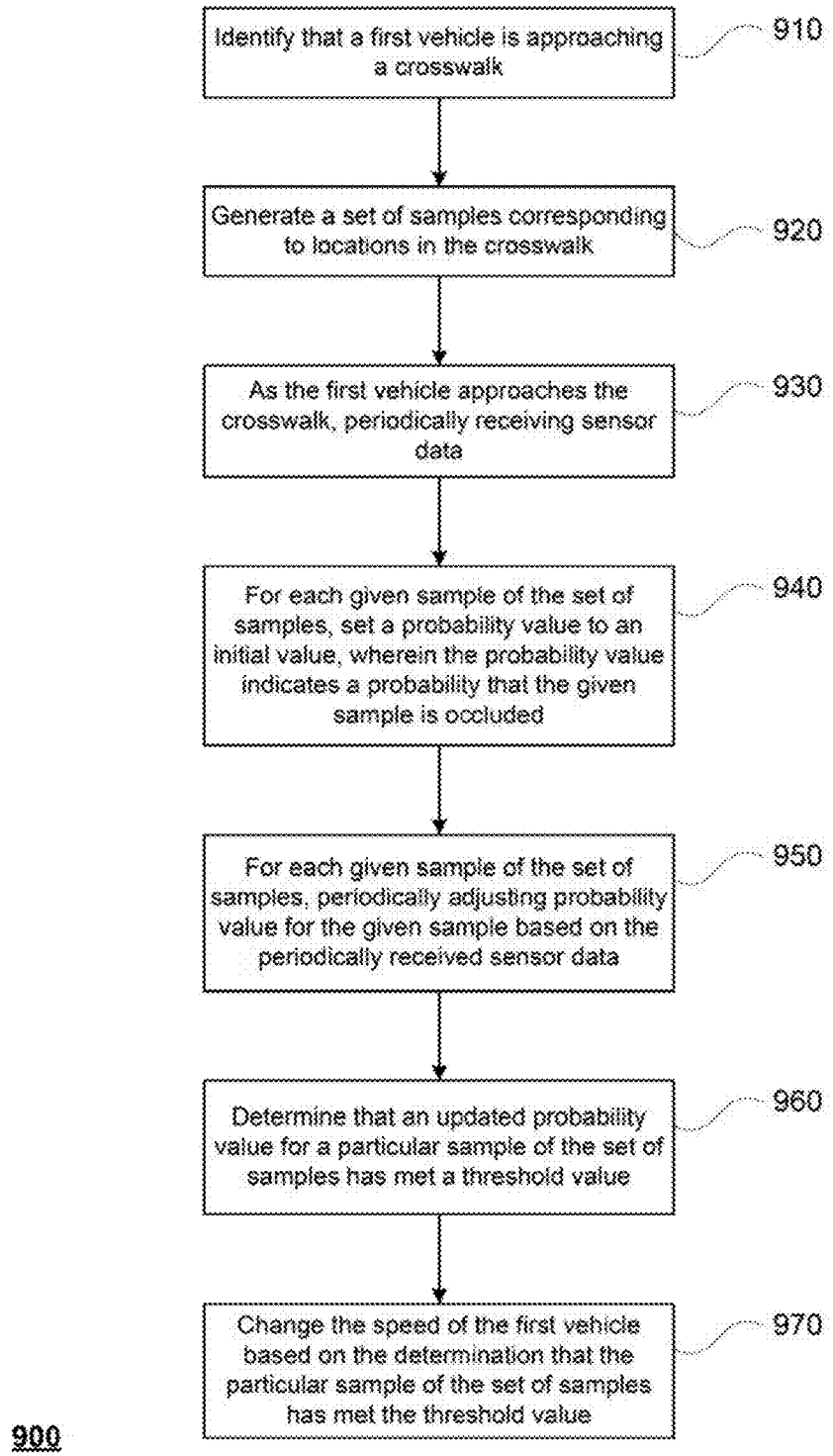
FIG. 9 is an example flow diagram in accordance with aspects of the disclosure.

FIG. 9 is an example flow diagram 900 which depicts some of the aspects described above which may be performed by one or more computing devices such as one or more computing devices 110 of vehicle 100. In this example, it is identified that a first vehicle, for example corresponding to vehicle 100, is approaching a crosswalk at block 910. A set of samples corresponding to locations in the crosswalk is generated at block 920. As the first vehicle approaches the crosswalk, sensor data is periodically received at block 930. For each given sample of the set of samples, a probability value is set to an initial value at block 940. This probability value indicates a probability that the given sample is occluded. For each given sample of the set of samples, the probability value for the given sample is periodically adjusted based on the periodically received sensor data at block 950. When an updated probability value for a particular sample of the set of samples has met a threshold value is determined at block 960. The speed of the first vehicle is then changed based on the determination that the particular sample of the set of samples has met the threshold value at block 970.

Because the consequence of a probability value meeting the threshold value is to slow the vehicle down as it approaches the crosswalk, in some instances the vehicle's computers may not need to use the proximity values. For example, if the autonomous vehicle is already driving at a particular speed, such as 15 to 25 miles per hour, there may be no need to use the probability values as discussed above. Rather, the autonomous vehicle's one or more computing devices may simply stop adjusting the proximity values, never determine them at all, or adjust the proximity values (without comparing them to the threshold) so that the information is readily available should the autonomous vehicle's one or more computing devices increase the vehicle's speed such that the probability values would be needed again.

In some examples, the autonomous vehicle's one or more computing devices may also determine whether the vehicle has a priority right and use this information to adjust the values used to decrease the probability values and/or the threshold value. For example, the vehicle may have priority when approaching a green traffic signal light (go signal) corresponding to the lane and direction of travel in which the autonomous vehicle is or when the autonomous vehicle is approaching an unprotected crosswalk where there is no traffic signal light. In this case, the values used to decrease the probability values, such as the first, second, or third values of decision tree 800, may be decreased so as to increase the likelihood of a probability value meeting the threshold value. In addition or alternatively, the threshold value may be decreased to similarly increase the likelihood of a probability value meeting the threshold value. Both a decrease to the values used to decrease the probability values as well as the threshold value may cause the autonomous vehicle's one or more computing devices to act more conservatively making it more likely to slow the vehicle down. This decrease may be performed by using an additional multiplier (e.g., 0.9 or more or less) or by simply referring to a different set of values from a table, database, or other storage.

In addition, various different scales may be used for the probability values. For example, rather than being on a scale from 0 to 1, where 1 is a very high probability of an occluded object and 0 is a very low probability of an occluded object, the scale may range from 1 to 0, where 0 is a very high probability of an occluded object and 1 is a very low probability of an occluded object. In such a case, the decreases and increases resulting from the various decisions and outcomes described above may be reversed. Thus, rather than decreasing a probability value when a sample is visible or protected, the probability value may be increased, for example, by multipliers that are greater than 1. In addition, the first, second, and third values of decision tree may also be adjusted such that the third value is less than the second value which is less than the first value. Similarly, rather than increasing the probability when a sample is not visible and not protected, the probability value may be decreased, for example, by a multiplier that is less than 1. Thus, in this example, the threshold value used may be a value closer to 0, such as 0.2 or more or less.

The aspects described above thus allow for an autonomous vehicle's computers to make decisions about how to approach and maneuver through crosswalks in a reasonable and efficient way. For example, such aspects allow the autonomous vehicle's one or more computing devices to reason about the vehicle's environment without being too conservative and overreacting to occlusions that are sufficiently far from the vehicle's trajectory. In addition, the reasoning is not computationally intensive and can be easily recomputed when updates from the autonomous vehicle's perception system are available.

Although the examples described above relate to autonomous vehicles, this information may be used in non-autonomous vehicles or autonomous vehicle's operating in semi-autonomous or manual driving modes. In this regard, when the threshold is met, a notification may be provided to the driver indicating that a portion of a crosswalk is occluded, for example, and to proceed with caution. In more sophisticated systems, a vehicle's one or more computing devices may automatically apply the vehicle's brakes or otherwise limit or reduce the acceleration of the vehicle (prevent acceleration, reduce gas flow, or limit electricity flowing to the vehicle's engine) to slow the vehicle down.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer-implemented method comprising:
identifying, by one or more computing devices, that a first vehicle is approaching a crosswalk;
generating, by the one or more computing devices, a set of samples corresponding to locations in the crosswalk;
periodically receiving, by the one or more computing devices, sensor data;
for each given sample of the set of samples:
setting, by the one or more computing devices, a probability value to an initial value, wherein the probability value indicates a probability that the given sample is occluded, and
as the first vehicle approaches the crosswalk periodically adjusting, by the one or more computing devices, probability value for the given sample based on the periodically received sensor data;
determining, by the one or more computing devices, that an updated probability value for a particular sample of the set of samples has met a threshold value; and
changing, by the one or more computing devices, the speed of the first vehicle based on the determination that a sample of the set of samples has met the threshold value.

2. The method of claim 1, wherein adjusting the probability value for a first given sample of the set of samples is further based on whether the sensor data indicates that a second vehicle is crossing through the location of the first given sample.

3. The method of claim 2, wherein adjusting the probability value for the first given sample includes decreasing the probability value for the first given sample when the sensor data indicates that the second vehicle is crossing through the location of the first given sample.

4. The method of claim 1, wherein adjusting the probability value for a first given sample of the set of samples is further based on whether the sensor data indicates that another vehicle is crossing through the crosswalk and the location of the first given sample is on a far side of the another vehicle, further from the first vehicle.

5. The method of claim 1, wherein adjusting the probability value for a first given sample of the set of samples includes decreasing the probability value for the first given sample when the sensor data indicates that another vehicle is crossing through the location of the given sample.

6. The method of claim 1, wherein adjusting the probability value for a first given sample of the set of samples is further based on whether the sensor data indicates the first given sample is visible to a sensor of the first vehicle.

7. The method of claim 6, wherein adjusting the probability value for the first given sample includes decreasing the probability value for the first given sample when the sensor data indicates that the first given sample is visible to a sensor of the first vehicle.

8. The method of claim 6, wherein adjusting the probability value for the first given sample includes increasing the probability value for the first given sample when the sensor data indicates that the first given sample is not visible to a sensor of the first vehicle.

9. A system comprising one or more computing devices, having one or more processors, the one or more computing devices configured to:
- identify that a first vehicle is approaching a crosswalk;
- generate a set of samples corresponding to locations in the crosswalk;
- periodically receive sensor data;
- for each given sample of the set of samples:
  - set a probability value to an initial value, wherein the probability value indicates a probability that the given sample is occluded, and
  - as the first vehicle approaches the crosswalk, periodically adjust probability value for the given sample based on the periodically received sensor data;
- determine that an updated probability value for a particular sample of the set of samples has met a threshold value; and
- change the speed of the first vehicle based on the determination that a sample of the set of samples has met the threshold value.

10. The system of claim 9, wherein the one or more computing devices are further configured to adjust the probability value for a first given sample of the set of samples further based on whether the sensor data indicates that a second vehicle is crossing through the location of the first given sample.

11. The system of claim 10, wherein the one or more computing devices are further configured to adjust the probability value for the first given sample by decreasing the probability value for the first given sample when the sensor data indicates that the second vehicle is crossing through the location of the first given sample.

12. The system of claim 9, wherein the one or more computing devices are further configured to adjust the probability value for a first given sample of the set of samples further based on whether the sensor data indicates that another vehicle is crossing through the crosswalk and the location of the first given sample is on a far side of the another vehicle, further from the first vehicle.

13. The system of claim 9, wherein the one or more computing devices are further configured to adjust a probability value for a first given sample of the set of samples by decreasing the probability value for the first given sample when the sensor data indicates that another vehicle is crossing through the location of the first given sample.

14. The system of claim 9, wherein the one or more computing devices are further configured to adjust the probability value for a first given sample of the set of samples further based on whether the sensor data indicates the first given sample is visible to a sensor of the first vehicle.

15. The system of claim 14, wherein the one or more computing devices are further configured to adjust the probability value for the first given sample by decreasing the probability value for the first given sample when the sensor data indicates that the first given sample is visible to a sensor of the first vehicle.

16. The system of claim 14, wherein the one or more computing devices are further configured to adjust the probability value for the first given sample by increasing the probability value for the first given sample when the sensor data indicates that the first given sample is not visible to a sensor of the first vehicle.

17. The system of claim 9, further comprising the first vehicle.

18. A non-transitory, tangible machine readable medium on which instructions are stored, the instructions, when executed by one or more processors, cause the one or more processors to perform a method, the method comprising:
- identifying that a first vehicle is approaching a crosswalk;
- generating a set of samples corresponding to locations in the crosswalk;
- periodically receiving sensor data;
- for each given sample of the set of samples:
  - setting a probability value to an initial value, wherein the probability value indicates a probability that the given sample is occluded, and
  - as the first vehicle approaches the crosswalk, periodically adjusting probability value for the given sample based on the periodically received sensor data;
- determining that an updated probability value for a particular sample of the set of samples has met a threshold value; and
- changing the speed of the first vehicle based on the determination that a sample of the set of samples has met the threshold value.

19. The medium of claim 18, wherein adjusting the probability value for a first given sample of the set of samples is further based on whether the sensor data indicates that a second vehicle is crossing through the location of the first given sample.

20. The medium of claim 18, wherein adjusting the probability value for the first given sample is further based on whether the sensor data indicates that another vehicle is crossing through the crosswalk and the location of the first given sample is on a far side of the another vehicle, further from the first vehicle.

* * * * *